Patented Mar. 14, 1939

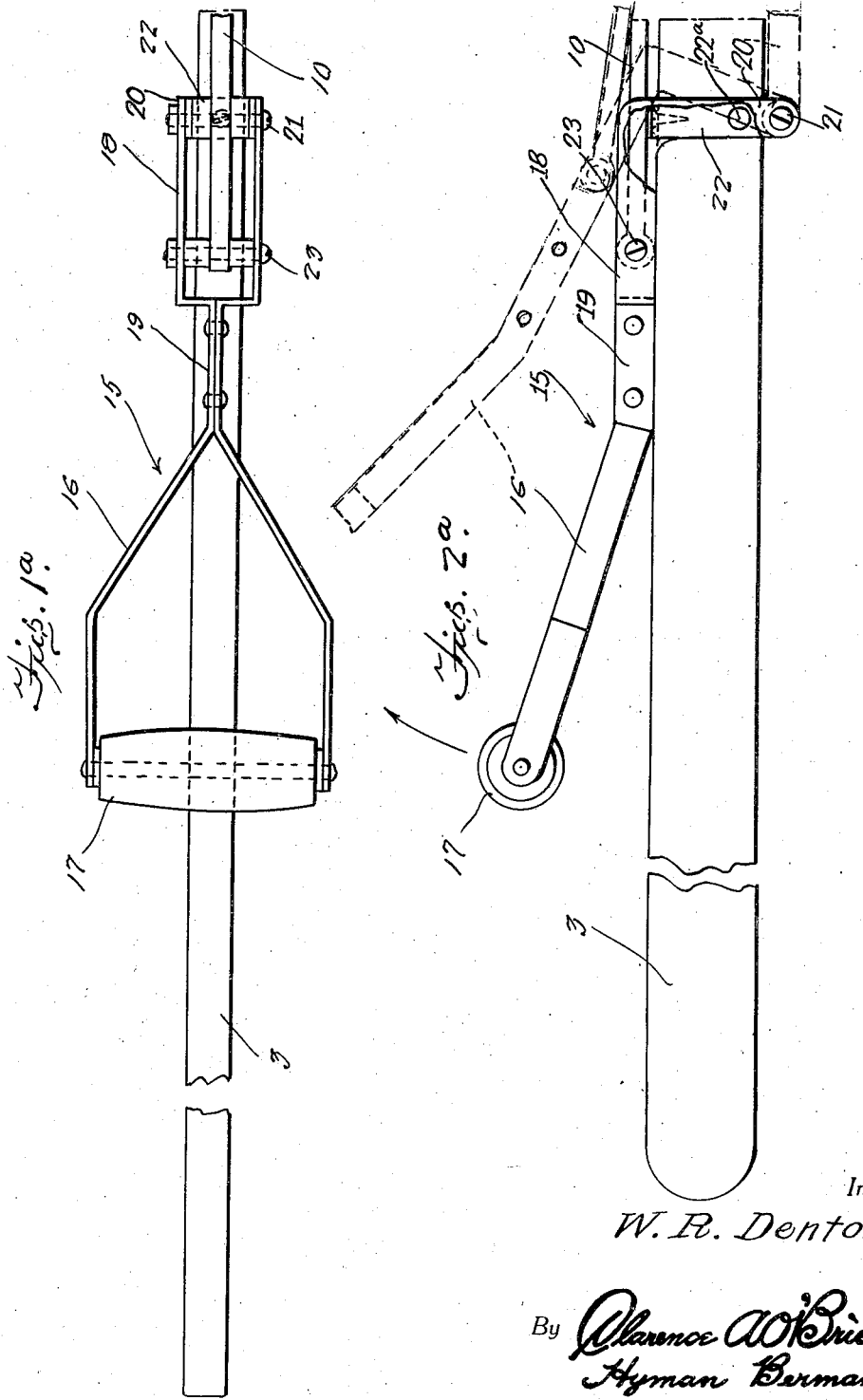

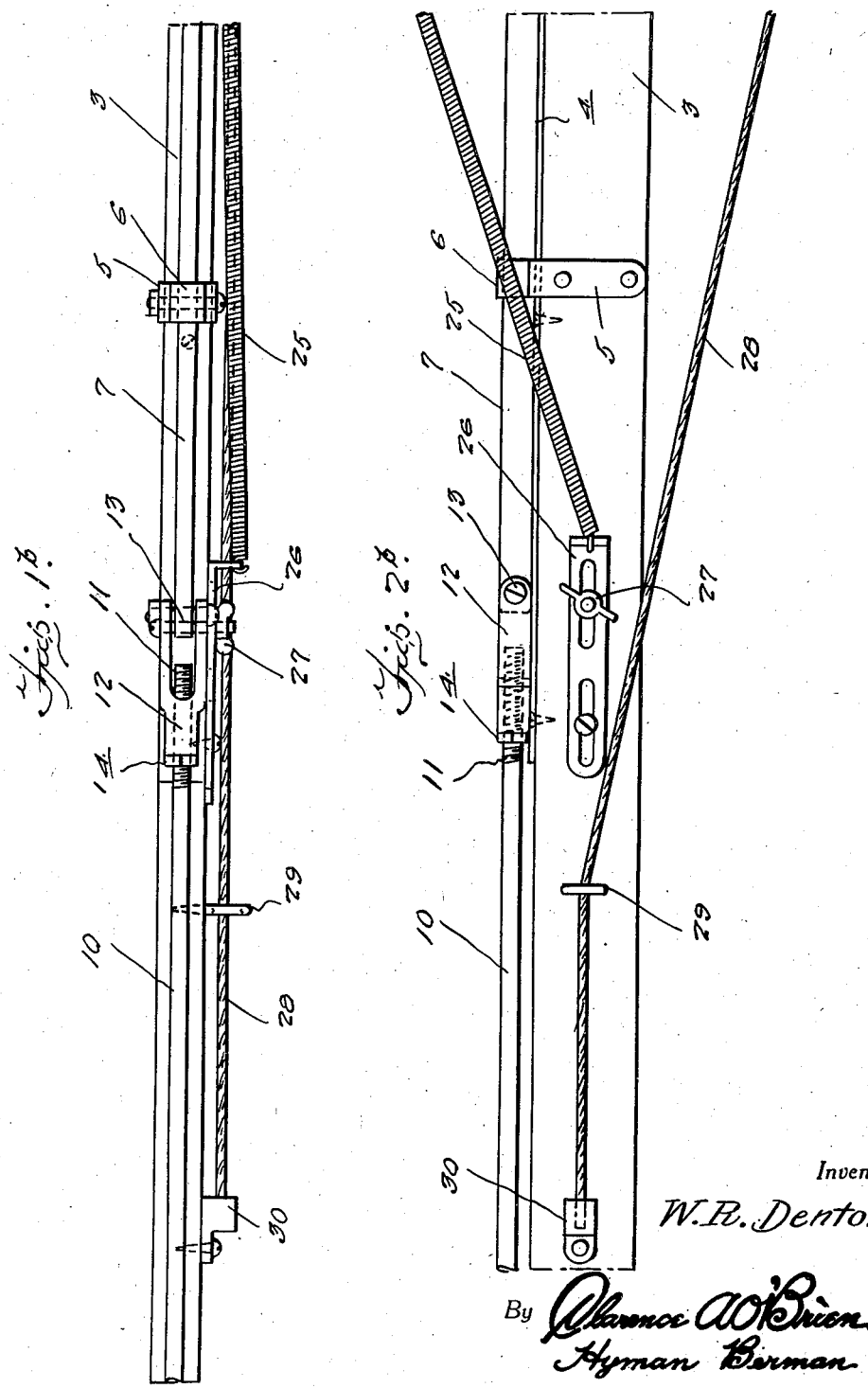

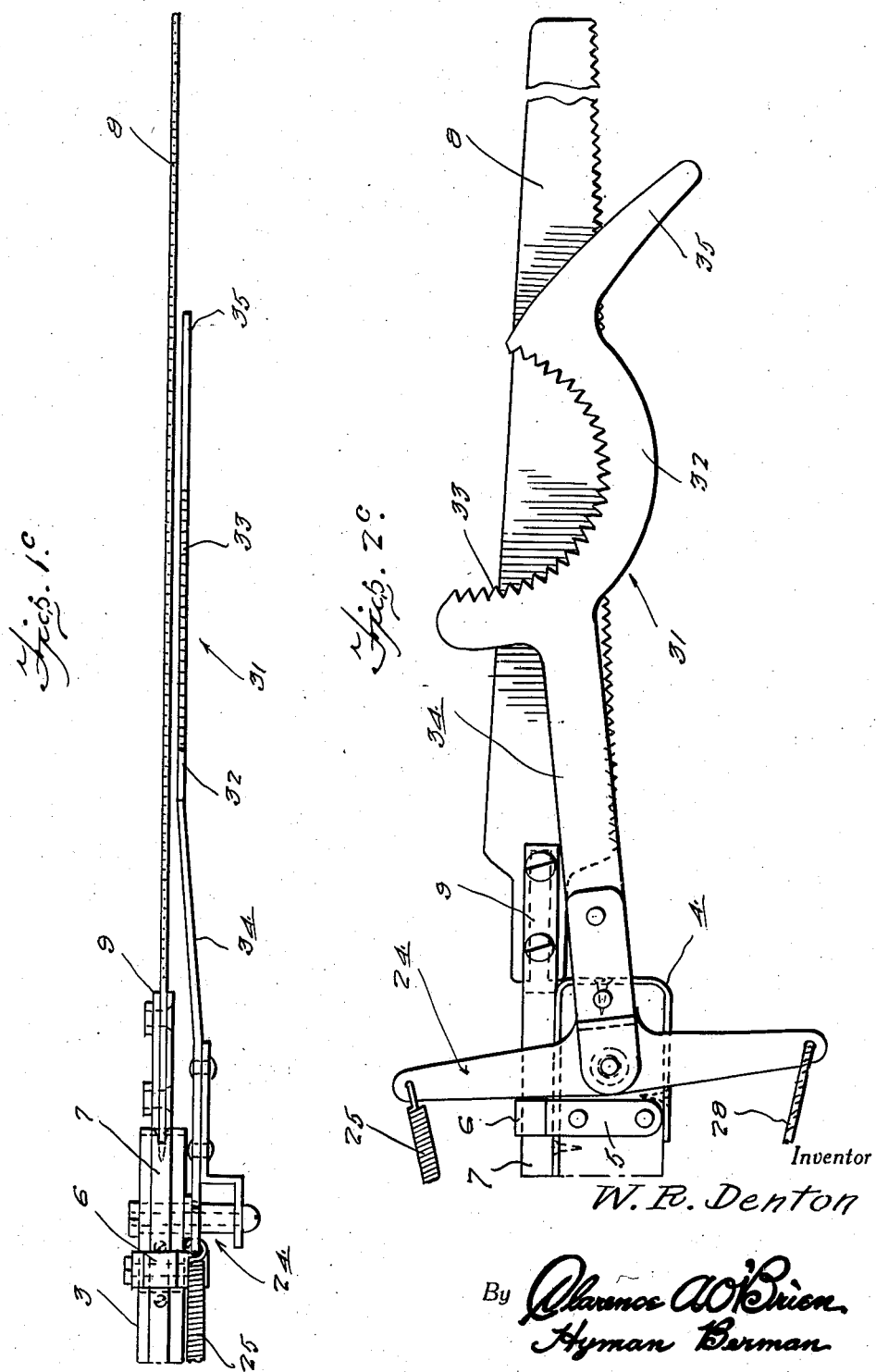

2,150,268

UNITED STATES PATENT OFFICE 2,150,268

PRUNING IMPLEMENT

Walter R. Denton, Baldwin, N. Y., assignor of one-half to Walter Denton, Jr., Baldwin, N. Y.

Application October 16, 1937, Serial No. 169,488

4 Claims. (Cl. 30—166)

The invention herein illustrated and specifically described and claimed relates to what may be broadly referred to as a pruning implement, and has specific reference to a novel and improved manually controlled reciprocatory saw.

As implied by the preceding introductory statement, I am sufficiently conversant with the general status of the prior field of invention to appreciate that it is not new to provide a reciprocating saw on a reach pole or rod. It is proper, therefore, to direct the attention of the reader to the primary structural newness with which we are hereinafter concerned. That is to say, I have provided an improved saw and actuating means therefor, although the chief novelty is directed to the association with the saw of remote controlled means for grappling and maintaining the branch in effective cutting relationship with the teeth of the saw.

Under the circumstances, it will therefore be apparent that one phase of the improvement has to do with the adoption and use of a structurally refined longitudinally reciprocating saw, whereas the companion phase of the invention concerns itself with a structurally new and ingeniously located limb or branch holding unit, which part cooperates to permit the user, while standing on the ground, to effectively and cleanly sever fruit tree limbs.

Other and more specific features and advantages will become evident from the description and drawings.

In the drawings, wherein I utilize like reference numerals to designate like parts throughout the views:—

Figure 1a is a top plan view of what may be called the lower end portion of the reach pole, detailing in particular the operating means for the push-pull saw.

Figure 1b is a top plan view of the intermediate portion of the structure complemental to Figure 1a.

Figure 1c is likewise a top plan view of the outer or so-called upper end of the structure detailing the saw and closely allied parts or mechanism.

Figure 2a is a side elevation, as is obvious, of the structure seen in Figure 1a.

Figure 2b is a side elevation of the assemblage of parts depicted in top plan in Figure 1b.

Figure 2c is a side elevation of the saw and branch engaging means seen in top plan in Figure 1c.

Referring now to the drawings by distinguishing reference numerals, it will be observed that the reach pole or rod is denoted by the numeral 3 and this is of any appropriate dimension and length. In fact, this should be of such a length as will adapt it for convenient use without requiring the user to climb the tree or mount a ladder as is customarily done when using so-called pruning knives and equivalent cutting devices of the remote controlled type. Reference being had to Figure 2c it will be observed that the outer or upper end of the rod is reinforced by a protecting metal band 4. This band fits in a cap-like manner over the rod to render it strong and sturdy at this needed point. U-shaped brackets are arched over and fastened to the rod at longitudinally spaced points. These brackets, denoted by the reference numerals 5, have their bight or connective portions 6 so arranged as to function as guides for the reciprocatory actuating arm 7 carrying the straight type saw 8. The saw is appropriately fastened, with requisite rigidity to the part 7 as indicated at 9 in Figure 2c. This allows the saw to be removed for sharpening or replacement as required. As shown in Figures 1b and 2b the remote control operating rod 10 is threaded at 11 into a coupling 12 which coupling is pivotally adjoined at 13 to the actuating rod 7. The adjustment in part is maintained by a lock nut 14.

The hand controlled operating unit or lever means for the rod 10 is shown in Figure 1a and unitarily denoted by the numeral 15. It comprises a swingable yoke, that is a main yoke 16 carrying an appropriate hand grip 17. Then there is an auxiliary yoke at 18 and this functions as a bell-crank and joined to the main yoke by a shank portion 19. These parts may be of any appropriate construction to obtain the approximate proportions shown in Figure 1a. The downturned ends of the yoke 18 as indicated at 20 normally straddle the pole 3. At this point it will be observed that a U-shaped adapter bracket or fixture 22 embraces the rod 3, being secured thereto rigidly by suitable fastenings 22a. The parallel arm portions of this bracket project below said pole or rod 3 to accommodate a transverse pivot pin 21. This arrangement provides a suitable foundation for hingedly connecting the free ends of the aforementioned downturned portions 20 thereto. It follows therefor, that the so-called main and auxiliary yokes function in providing the aforementioned lever unit, the auxiliary yoke serving as an operating crank for the motion transmitting rod 10. Thus, the rod 10 has pivotal operating connection at one end as at 13 with the complemental actuating rod 7, while at its opposite end it is pivotally connected as at 23 with said bell-crank. It is evident therefore, that by catching hold of the hand grip 16 and rocking the lever unit toward and from the pole 3 it travels back and forth through an arcuate path and imparts the desired reciprocatory motion to the interconnected or complemental rods 7 and 10. The dotted line representation of lever 16 shows it in an intermediate position during the operation of the device while the dotted line representation of the down turned portions 20 parallel with the pole 3 and beneath said pole indicates the position reached by these portions at the end of the maximum stroke.

Attention now comes to Figure 2c showing a pivoted rockable cross-head 24. To the upper arm of this a coiled spring 25 is attached and said spring is secured at its opposite end to an anchoring bracket 26 adjustably mounted on the pole and maintained in place by a thumb nut 27 (see Figure 2b). A release cord or rope 28 connects with the lower end of the cross-head and passes through a guide eye 29 and is fixedly anchored on the pole at the point 30. These parts serve collectively as the retaining and release means for the limb or branch holding means or unit 31.

The part 31 preferably comprises a segmental jaw or grip 32 having gripping teeth 33. The arm or shank 34 affords the operating connection with the rocker or cross-head means 24. At the point 35 is an extension or tang, this being at the outer end of the toothed jaw and being disposed in normal converging relationship with respect to the teeth of the saw. It cooperates with the saw in providing a pilot element to spread the jaws to open position and to facilitate feeding or directing the device on the limb to obtain the desired friction grip or hold. Normally the spring 25 functions to maintain the unit 31 in yieldable engagement with the under side of the limb (not shown). On the other hand, the pull cord or rope 28 serves to release the jaws, as is evident.

Briefly, it will be observed therefore, that the structure as a whole is characterized by the reach pole 3 forming the principal handling means, this having mounted thereon for reciprocation the toothed saw 8. A sectional self adaptable operating connection provides the motion transmitting means between the saw and the hand actuated frame or lever unit 15. Added to this is a single jaw unit located in parallelism to the saw and movable from and toward the saw teeth. This is novel in that it includes the jaw opening means 35, the yieldable retention device, and the release cord which is ever so handy if and when the saw gets caught or hung.

The operation is equally simple. All that is necessary is to place the saw blade on top of the limb. Then the whole structure is bodily shoved in a direction toward the limb and the cam action of the limb encounters the tank or cam finger 35 opening for spreading the jaw 31, whereby to allow the jaw to readily embrace the underside of the same limb. If the saw is found to be in an improper position the jaw can be readily released by the release cord as evident. When once the device is set the saw is reciprocated back and forth while holding the pole in an evident manner.

This type of saw permits the cutting of limbs up to four inches in diameter without the necessity of climbing the tree. Manifestly, the chief objective is the adoption and use of the jaw retention or limb holding means which serves to maintain pressure on the underside of the lumb, thus keeping the saw blade against the limb and materially aiding the cutting action of the saw. The pressure supplied by the spring tensioned jaw and the leverage of the operating handle make it an easy operating saw especially ideal for pruning work.

It is thought that the description taken in connection with the drawings will enable a clear understanding of the invention to be had. Therefore, a more lengthy description is thought unnecessary.

While the preferred embodiment of the invention has been shown and described, it is to be understood that minor changes coming within the field of invention claimed may be resorted to if desired.

I claim:

1. A pruning implement of the class described comprising a pole, a reciprocatory saw mounted for operation on said pole and having remote control means, an arcuate limb-engaging unit provided with an arm at one end and a cam finger at the opposite end, a cross-head on said pole, said operating arm being adjoined to said cross-head, a spring attached to one end of the cross-head and anchored to the pole, and a release cord attached to the opposite end of the cross-head and fastened on the pole.

2. A pruning implement of the class described comprising a longitudinally elongated reach pole, longitudinally spaced guides fixedly mounted on said pole, a saw actuating rod slidable in said guides and in alignment with said pole, a saw connected to the outer end of said actuating rod, a coupling pivotally attached to the inner end of said actuating rod, an operating rod in longitudinal alignment with the pole as well as said actuating rod, the outer end of said operating rod being adjustably connected with said coupling, a U-shaped bracket embracing and fixed to said reach pole, a yoke unit operatively connected with said bracket, the inner end of said operating rod being pivotally and detachably connected with said yoke unit, said yoke unit including a hand grip, and limb engaging means operatively mounted on the outer end of said reach pole and arranged in coacting relationship with respect to said saw.

3. In a pruning implement of the class described, a longitudinally elongated reach pole, a manually controlled saw disposed at the outer end of said pole, remote control operating means for the saw slidably mounted on the pole, a limb-engaging jaw unit comprising an arcuate jaw disposed alongside of and in substantial parallelism with the saw, said jaw being provided with anti-slipping teeth, the outer end of said jaw being fashioned to provide a laterally directed cam finger disposed at acute angles with respect to the longitudinal dimension of the saw, an operating arm attached to the inner end of said jaw, a cross-head pivotally mounted intermediate its ends on the outer end of said reach pole, said arm being operatively adjoined to the intermediate portion of said cross-head, a coiled spring attached to one end of the cross-head and adjustably anchored on the intermediate portion of the reach pole, and a release cord attached to the opposite end of the cross-head and fastened on the pole.

4. A pruning implement of the class described comprising a longitudinally elongated reach pole, longitudinally spaced guides fixedly mounted on said pole, a saw actuating rod slidable in said guides and arranged in alignment with said reach pole, a saw connected to the outer end of said actuating rod, a coupling pivotally connected with the inner end of said actuating rod, a companion operating rod in longitudinal alignment with said pole as well as said actuating rod, the outer end of said operating rod being adjustably adjoined to said coupling, an adapter bracket embracing and fastened to said reach pole at a predetermined point, a hand controlled lever unit including bell-crank means, said bell-crank means embracing the rod and bracket and being pivotally attached to said bracket, the inner end of said operating rod being pivotally attached to said bell-crank means, said lever unit including a hand grip, and limb engaging means operatively mounted on the outer end of the reach pole and disposed in coacting relationship with respect to the saw.

WALTER R. DENTON.